United States Patent [19]

Kobayashi et al.

[11] 4,155,281
[45] May 22, 1979

[54] FRESH FISH PROCESSING SYSTEM

[75] Inventors: Hachiro Kobayashi, Tokyo; Yasushi Tanaka, Ishinomaki, both of Japan

[73] Assignee: Yashima Kogyo Kabushiki Kaisha, Miyagi, Japan

[21] Appl. No.: 821,979

[22] Filed: Aug. 4, 1977

[30] Foreign Application Priority Data

Aug. 5, 1976 [JP] Japan .................................. 51-092824
Aug. 5, 1976 [JP] Japan .................................. 51-092825
Aug. 5, 1976 [JP] Japan ............................ 51-103980[U]
Aug. 5, 1976 [JP] Japan ............................ 51-103981[U]
Aug. 10, 1976 [JP] Japan ................................. 51-106050

[51] Int. Cl.² .......................................... A22C 25/14
[52] U.S. Cl. ................................................... 17/59
[58] Field of Search ................... 17/58, 59, 60, 70, 55

[56] References Cited

U.S. PATENT DOCUMENTS

| | | | |
|---|---|---|---|
| 1,799,948 | 4/1931 | Bergen | 17/60 |
| 2,208,644 | 7/1940 | Rue | 17/60 |
| 2,529,920 | 11/1950 | Danielsson | 17/58 |
| 2,686,928 | 8/1954 | Ullin | 17/58 |
| 2,775,785 | 1/1957 | Kurzbin | 17/59 |
| 3,843,998 | 10/1974 | Wenzel | 17/60 |

Primary Examiner—J. M. Meister
Attorney, Agent, or Firm—Armstrong, Nikaido, Marmelstein & Kubovcik

[57] ABSTRACT

Disclosed is a fish processing system having endless conveying means, a plurality of chuck units provided on the conveying means and adapted to cramp fish bodies, head separating means provided at a point on the path of travel of the fish bodies and adapted to separate head portion from the fish and guts removing means adapted to remove guts from the fish bodies.

7 Claims, 10 Drawing Figures

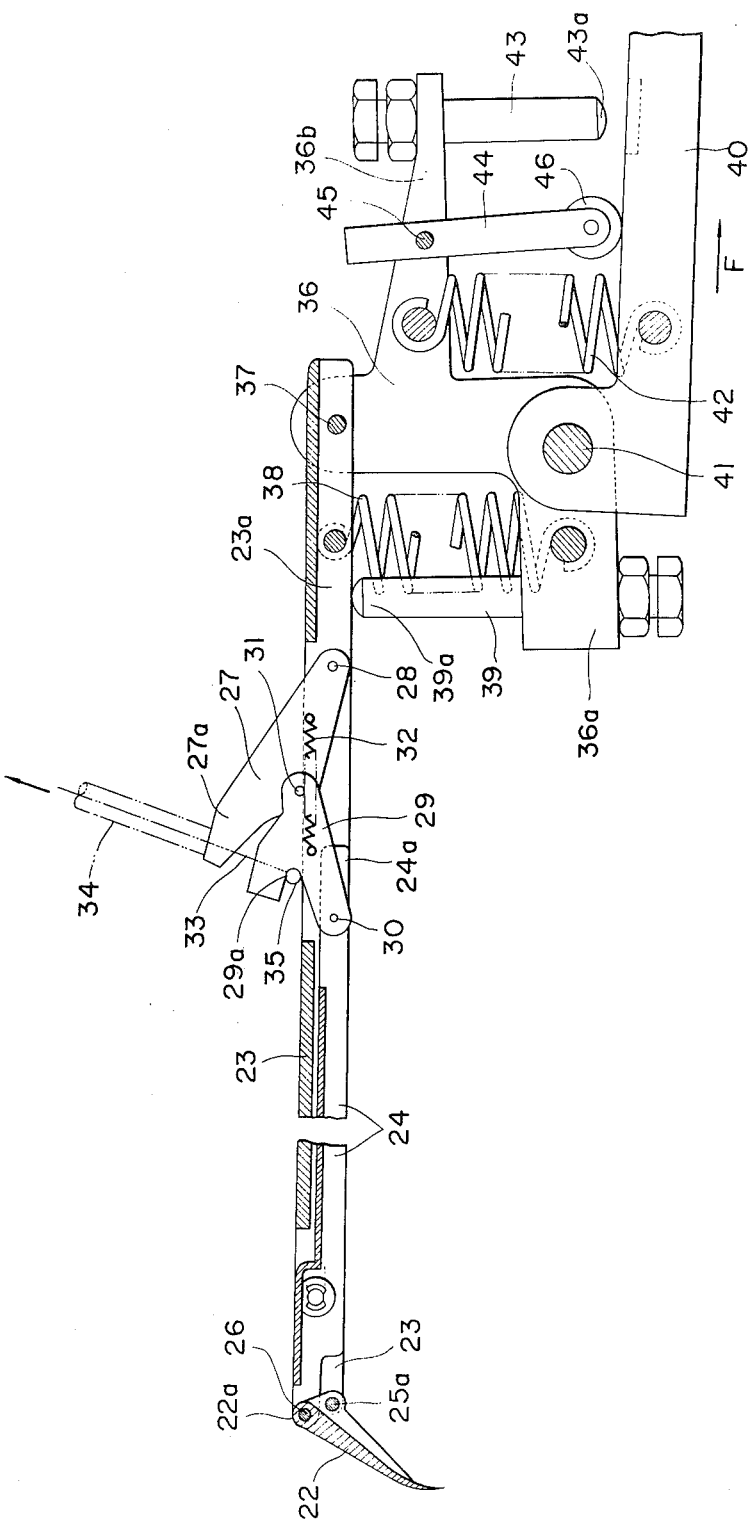

FRESH FISH PROCESSING SYSTEM

BACKGROUND OF THE INVENTION

The present invention relates to a fish processing system and, more particularly, to a fish processing system capable of separating the head portion from the body and removing guts from the fish body during the conveyance thereof.

In conventional fish processing method, especially for manufacturing boiled fish paste from meat of walleye pollacks, at first the head portion is separated from the body and then the guts are removed. Then, the remaining meat and bones are ground down or mashed to prepare the material. The separation of the head and removal of guts are carried out manually. Especially, in case of the walleye pollack, the guts removal is mechanically difficult, because the cod roe contained in the body has to be taken out without being damaged.

SUMMARY OF THE INVENTION

It is therefore an object of the invention to provide an automatic fish processimg system capable of separating the head and removing the guts from fish bodies.

It is another object of the invention to provide a safe and stout cramping means for cramping fish bodies, suitable for use in fish processing system.

It is still another object of the invention to provide an automatic fish processing system capable of separating the head from the body, leaving the meat residing in head portion on the body.

It is still another object of the invention to provide guts removing means capable of removing guts such as cod roe from abdomen cavity of the fish, without damaging the guts, or the meat of the fish body.

To these ends, according to the invention, there is provided a fish processing system comprising endless conveying means going round sprockets having horizontal shafts, said conveying means carrying a plurality of chuck units arranged at a suitable pitch, head separating means disposed in the vicinity of upper run of said endless conveying means and guts removing means disposed close to the lower run of said endless conveying means.

BRIEF DESCRIPTION OF THE DRAWINGS

These and other objects, as well as advantageous features of the invention will become clear from the following description of the preferred embodiments taken in conjunction with the attached drawings in which:

FIG. 8 is an illustration showing a different operation of the gut removing means of FIG. 6.

DETAILED DESCRIPTION OF THE PREFERRED EMBODIMENTS

Figure 1:
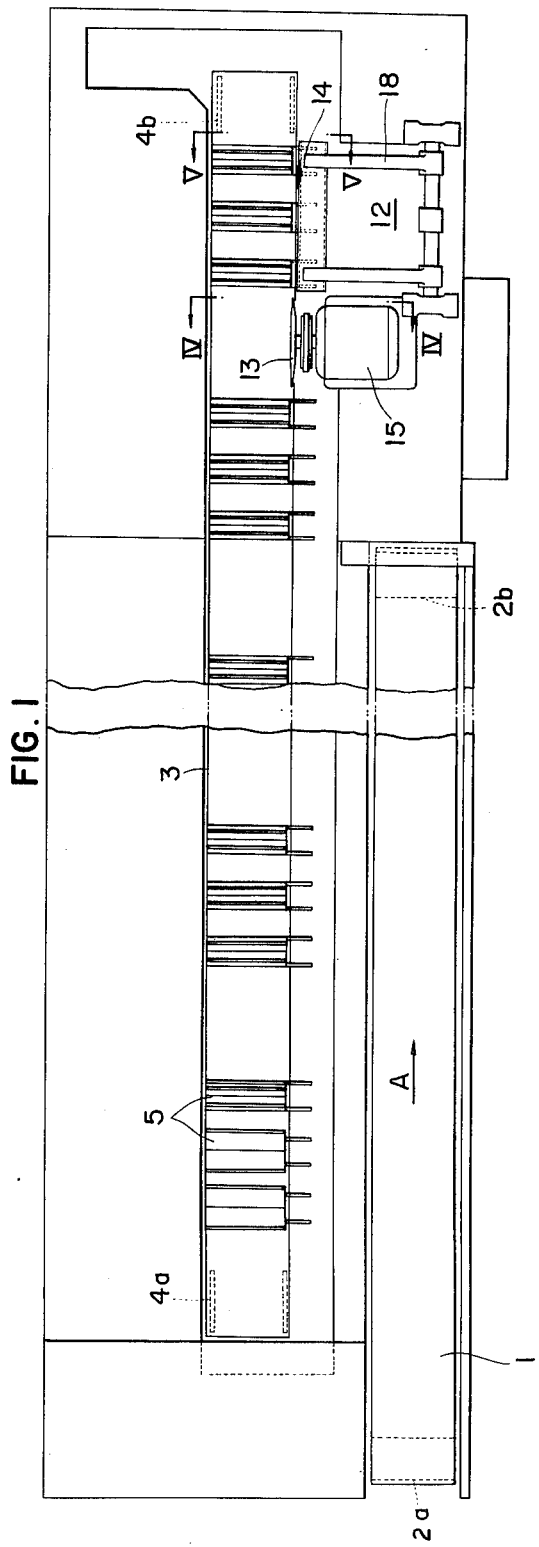
FIG. 1 is a partial plan view of a fish processing system embodying the present invention.
Figure 2:
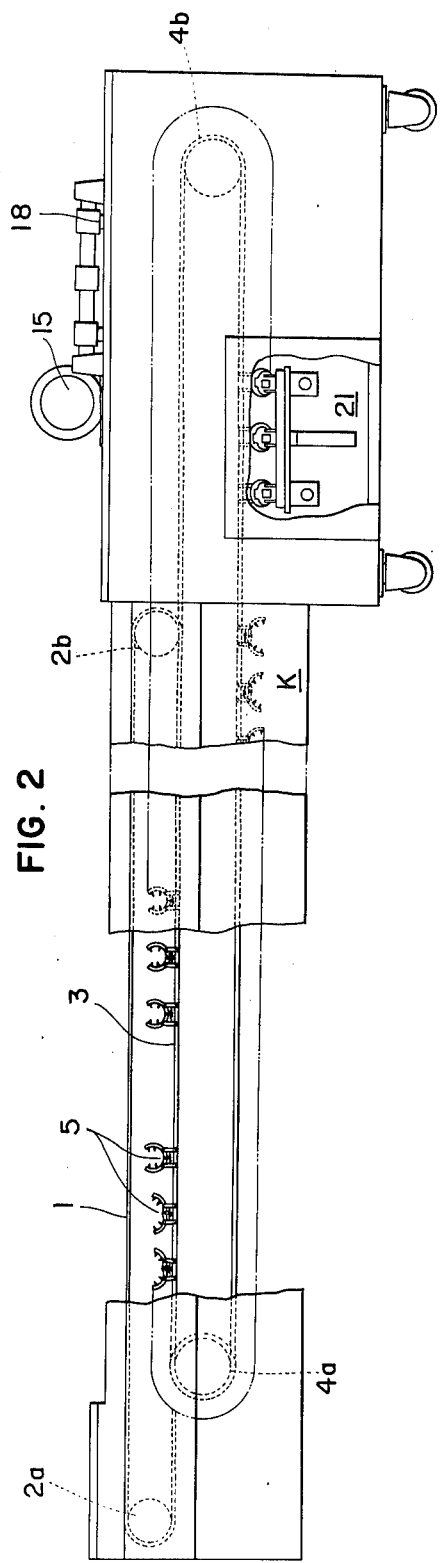
FIG. 2 is a partial elevation view of the system as shown in FIG. 1.

Referring to FIGS. 1 and 2, a fish supply conveyor belt 1 is stretched between pulleys 2a, 2b. The upper run of the conveyor belt moves in the direction of arrow A. An endless conveying means or a chain conveyor 3 going round sprockets 4a, 4b is disposed to extend in parallel with the supply conveyor belt 1. The chain conveyor 3 has an upper run which moves also in the direction of the arrow A. The chain conveyor 3 carries a plurality of groups of chuck units 5, each group consisting of three chuck units.

Figure 3:
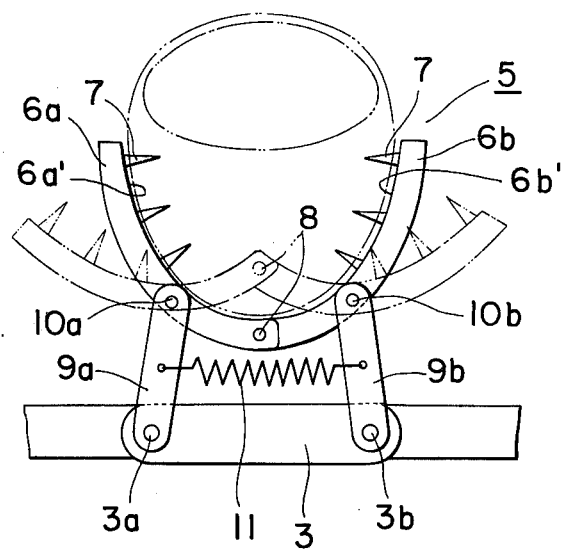
FIG. 3 is an illustration for explaining the manner of operation of chuck units.

As will be seen from FIG. 3, the chuck unit consists of a pair of cramping arms 6a, 6b the inner sides 6a', 6b' of which being curved to meet the profile of fish body. A plurality of chuck claws 7 are provided to extend inwardly of the chuck unit, on the inner sides 6a', 6b'. The cramping arms 6a and 6b are pivotably secured to each other at their one ends by means of a pin 8. Supporting rods 9a and 9b are pivotably secured to intermediate portions of the cramping arms 6a and 6b, by means of pins 10a and 10b, respectively. The supporting rods 9a, 9b are pivoted by pins 3a, 3b, respectively, on the chain conveyor 3. A tension spring 11 is stretched between the supporting rods 9a and 9b.

Figure 4:
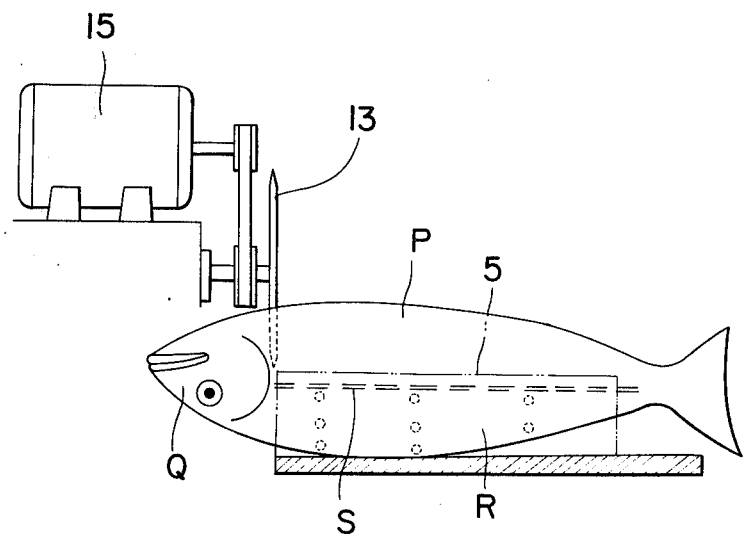
FIG. 4 is a side elevation view showing the separation of head from fish body.

In the close proximity of the upper run of the chain conveyor 3, there is provided head separating means 12 which are constituted by a head cutter 13 and a head thruster 14. As shown in FIG. 4, the head cutter is a rotary disc cutter driven by a motor 15, and is adapted to cut the fish, which is conveyed to the cutting position by the chuck unit with its abdomen directly upwardly, at a portion between the head Q and the body R, to the depth of backbone S, from the abdomen side.

Figure 5:
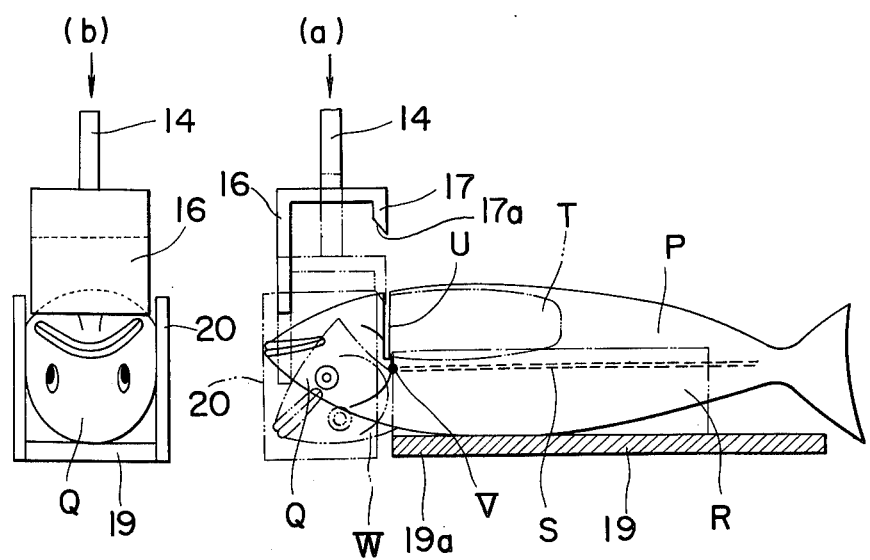
FIG. 5 is a side elevation and front elevation view showing thrusting of separated head.

As will be seen from FIG. 5, the head thruster 14 has a depressing rod 16 and a thrusting rod 17 extending downardly. The depressing rod 16 has a length larger than that of the thrusting rod 17, and is arranged to depress the head of the fish at a portion around the jaw, while the thrusting rod is adapted to thrust down the head Q bent by the depressing rod 16, and separate the latter from the body.

Three thrusters 14 are arranged at a pitch corresponding to the pitch of three chuck units 5, and are adapted to be unitarily moved up and down by means of a pivot arm 18. A bottom plate 19 has a front edge 19a positioned beneath the cutting portion 17a. Side plates 20 are adapted to support the sides of the head Q.

The chuck units having passed the head separating position are then turned as the chain conveyor goes round the sprocket 4b to the lower run. Thus, the chuck units are then directed downwardly.

Guts removing means 21 disposed close to the lower run of the chain conveyor 3 are adapted to remove the guts T from the fish body which has already been separated from the head. The guts removing means 21 has a guts removing claw 22, operating rod 23 and a slide rod 24. The guts removing claw 22 is rotatably secured to the operating rod 23, through pins 25a and 25b.

Figure 7:
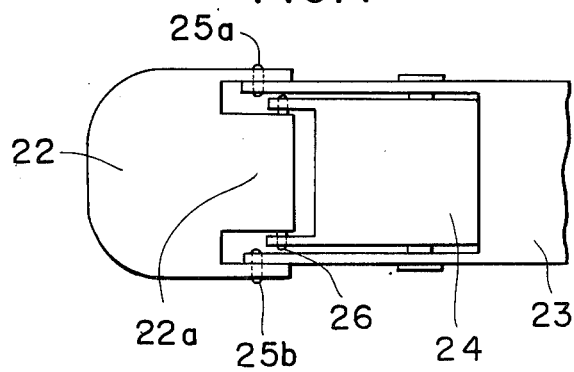
FIG. 7 is a plan view of a gut removing claw.

The claw 22 has an unitary projection 22a formed at its intermediate portion, to the end of which is pivoted the slide rod 24 by means of a pin 26. (See FIG. 7)

The slide rod 24 is allowed to slide within the operating rod 23 in the longitudinal direction of the latter, so that the claw 22 is swung in the direction of arrow C, as the slide rod 24 slides in the operating rod 23 in the direction of arrow B.

A first lever 27 is rotatably secured to the base portion 23a of the operating rod 23, by means of a pin 28, while a second lever 29 is rotatably secured to the base portion 24a of the slide rod 24, through a pin 30. These first and second levers 27 and 29 are pivotally secured to each other by means of a pin 31. A spring 32 is stretched between the first and the second levers 27 and 29, so as to bring the pins 28 and 30 close to each other.

The end 27a of the first lever 27 is abutted by the end of a flexible pipe 34 in which inserted is a wire 33.

The wire 33 is connected to a pin 35 which is in engagement with a retaining portion 29a formed on the second lever 29.

Consequently, as the wire 33 is pulled resisting to the force of the spring 32, the first and the second levers 27 and 29 are actuated to move the slide rod 24 ahead, thereby to cause the rotation of the claw 22 in the direction of the arrow C, as shown in FIG. 8.

A connecting member 36 is also rotatably secured to the base portion 23a of the operating rod 23, by means of a pin 37. The lower end of the connecting member 36 is angled as denoted by 36a. A spring 38 is stretched between the portion 36a of the connecting member 36 and the operating rod 23. An adjusting bolt 39 screwed into the portion 36a is adapted to bias the operating rod 23 away from the portion 36a, against the force of the spring 38.

It will be seen that the operating rod 23, the connecting member 36, the portion 36a and the adjusting bolt 39 in combination constitute a parallelogram.

A driving rod 40 adapted to be moved reciprocatively by suitable means is rotatably secured to the lower portion of the connecting member 36 by pin 41. The connecting rod 36 further has an extension 36b which extends in the direction opposite to the portion 36a. A spring 42 is stretched between the extension 36b and the driving rod 40. An adjusting bolt 43 screwed into the extension 36b is adapted to bias the extension 36b away from the driving rod 40, resisting the force of the spring 42. Thus, another parallelogram is constituted by the extension 36b, connecting rod 36, driving rod 40 and the adjusting bolt 43.

An actuating lever 44 is pivotally secured to the extension 36b, by means of a pin 45.

A roller 46 rotatably secured to the lower end of the actuating lever 44 rests on the driving rod 40. The arrangement is such that the connecting rod 36 is rotated around the pin 41, so as to downwardly tilt the operating rod 23 as shown in FIG. 8, as the lever 44 is moved by suitable means in the direction of the arrow D.

The chuck unit 5 on the chain conveyor 3 is adapted to be opened by suitable means at a position K (See FIG. 2), after having passed the guts removing means 21, so as to release the fish body downwardly. The chain conveyor is continuously turning and moves to the upper run after having passed the sprocket 4a.

In operation, fish bodies conveyed by the supply conveyor 1 are manually delivered to the chuck unit 5, one by one, with their abdomen directed upwardly. The chuck unit has been moved to the position with its cramping arms 6a, 6b spread away from each other, as shown by broken line at position K in FIG. 1. As the fish body is placed on the pin 8 with its abdomen directed upwardly, the supporting rods 9a, 9b are slightly moved away from each other, resisting the force of the spring 11. Then, as the pin 8 is moved downwardly beyond the dead point, the cramping arms are abruptly closed, so that the chuck claws 7 are driven into the fish body R, thereby to firmly grip or cramp the latter.

It will be seen that the chuck claws 7 in the form of spikes are deeply driven into the fish body to firmly cramp the latter, so that the fish body is stably held even when a strong external force is applied thereto in the subsequent head-separating and guts-removing steps, so as to ensure an efficient and correct disposal of the fish body.

Although the cramping arms are curved to meet the profile of the fish body in the illustrated embodiment, this is not exclusive and linear arms may be used instead. In the latter case, however, it is necessary to suitably select the positions and lengths of the chuck claws. For instance, a good cramping effect will be obtained when the chuck claws closer to the ends of the arms have longer length than others. Further, it is possible and effective to use curved chuck claws or hooked claws similar to fishing hooks.

As shown in FIG. 4, the fish cramped by the chuck unit 5 is then cut by the head cutter 13, at a portion thereof between the head Q and the body R, to the depth slightly above the backbone S.

The half-cut fish body is then moved to the position below the head thruster 14 as shown in FIG. 5. Subsequently, the head thruster 14 is lowered to bring the depressing rod 16 into contact with the jaw portion of the fish. A further lowering of the thruster causes the depressing rod 16 to depress the head downwardly. Since the backbone is left uncut, and since the front edge 19a of the bottom plate 19 is located below the slit U, the head Q is rotated and bent around a point V, as shown by the broken line, when depressed at the jaw, so that the mass of meat W in the head Q remains on the body portion R. A subsequent lowering of the thruster allows the thrusting rod 17 to break the backbone and separate the head Q from the body R. The head Q is prevented from being bent laterally, during this separation, by the side plates 20.

Thus, as designated at W in FIG. 5, the mass of meat residing in the head Q is separated from the head and held on the body side R, so as to improve the yield of the meat. At the same time, since the abdomen P has been regularly cut by the head cutter 13, the guts removing claws 22 can readily be introduced to the body in the subsequent gut removing step.

The head cutter has been described to be a rotary disc cutter. However, an endless belt saw, a reciprocating saw or other ordinary cutter having no saw-teeth may be used, to cut the head to an intermediate depth.

The fish body now having no head is conveyed to the lower run of the chain conveyor 3, held by the chuck unit with its abdomen P directed downwardly.

The chain conveyor is stopped when the fish bodies are brought to the position of the guts removing means 21 disposed close to the lower run of the chain conveyor 3. The guts removing means 21 are adapted to remove guts T from the fish bodies now having no head, as shown in FIG. 9.

Figure 6:
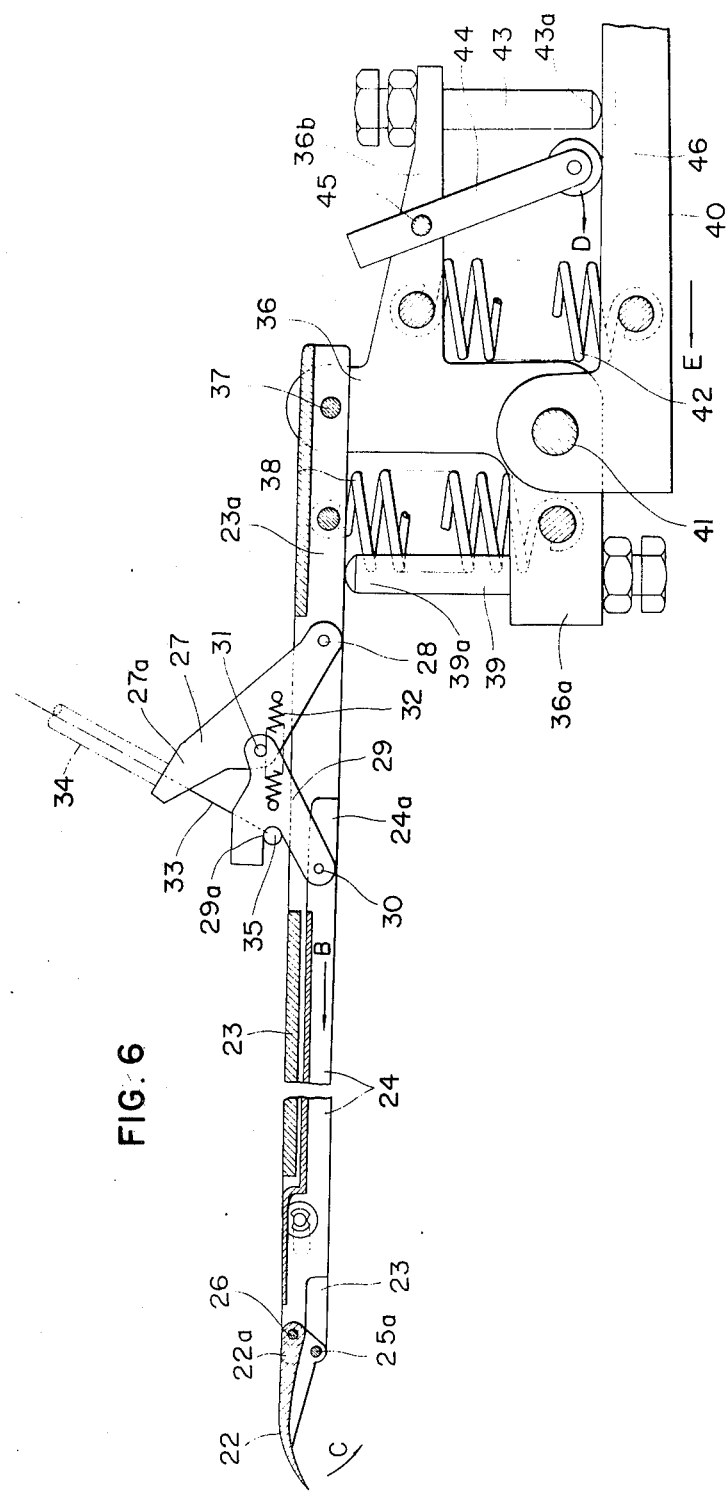
FIG. 6 is a longitudinal section view of gut removing means.
Figure 9:
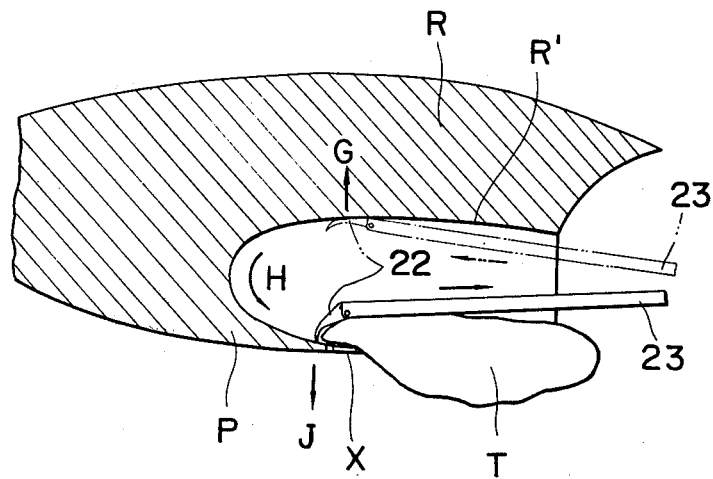
FIG. 9 is an illustration for explaining the gut removing operation by the gut removing claw.

More specifically, at first the driving rod 40 is moved in the direction of the arrow E, by suitable means, so that the operating rod 23 connected unitarily to the rod 40 through the connecting rod 36 is moved leftward, refering to FIG. 6, so as to drive the guts removing claw 22 in between the body R and the guts T (FIG. 9). During this driving, the operating rod 23 is inclined slightly upward, with respect to the driving rod 40, so that the claw 22 is pressed back by the wall R' of the body R. Thus, the operating rod 23 and the connecting rod 36 are slightly rotated around the pin 41, against the spring 42, so as to position the end 43a of the adjusting bolt 43 slightly above the face of the driving rod 40.

Consequently, the claw 22 is moved along the wall R' of the body R, slightly pressing the latter by the force provided by the spring 42, as denoted by G. As the end of the claw 22 reaches the rear end of the abdomen cavity the wire 33 is pulled by suitable means to cause the spreading of the first and the second levers 27 and 29 against the biasing force of the spring 32, so as to move the slide rod 24 in the operating rod 23 in the direction of the arrow B. Consequently, the claw 22 is swung around the pins 25a and 25b, in the direction of the arrow C, to the posture of FIG. 8.

The actuating lever 44 is rotated in the direction of the arrow D, against the spring 42, in substantial synchronization with the rotation of the claw 22. As a result, the end 43a of the adjusting bolt 43 is further raised above the face of the driving rod 40, and the connecting rod 36, as well as the operating rod 23, is rotated by a large angle around the pin 41. Consequently, the operating rod 23 comes to be directed downward, with respect to the driving rod 40, as shown in FIG. 8, At this stage, the driving rod 40 begins to travel in the direction of arrow F, from the condition of stroking in E direction, so that the end of the guts removing claw 22 moves to excavate the bottom of the abdomen cavity as denoted by arrow H in FIG. 9.

The driving rod 40 is further moved in the direction of the arrow F, with the claw 22 being rotated and the operating rod 23 being tilted, as shown in FIG. 8, downward with respect to the driving rod 40.

Due to the downward inclination of the operating rod 23 (See FIG. 9), the claw 22 is pushed back by the meat or wall X at the abdomen side P, causing the operating rod 23 to move slightly upward pivoting around the pin 37, against the pulling force of the spring 38, so that the lower face of the base section 23a of the operating rod section 23 moves slightly away from end 39a of the adjusting bolt 39. Consequently, the claw 22 is retracted along the wall X, imparting a slight pressure force J onto the latter, due to the force of the spring 38, raking guts T out of the abdomen cavity as shown in FIG. 9.

After the completion of the guts removal, the driving rod 40 is made to move in the direction of the arrow E. At the same time, the tensile force exerted through the wire 33 and the operation of the actuating lever 44 is released to allow the claw 22, operating rod 23 and the like to return to their starting positions, having completed the guts removing process.

The fish body now cleaned of the head Q and guts T is then dropped, as the cramping arms 6a, 6b are suitably moved away from each other, and is then conveyed for a subsequent process.

Figure 10:
FIG. 10 is an illustration showing another example of the gut removing claw.

In the foregoing embodiment, the guts removing claw is adapted to rotate around a point at the end of the operating rod. Alternatively, a guts removing claw 22' is formed unitarily with an operating rod 23', as shown in FIG. 10, at a certain inclination with respect to the axis of the latter 23'. Then, the operating rod 23' is moved such that the claw 22' performs a movement similar to that of FIG. 9.

It will be seen that the guts removing means in accordance with the invention is capable of functioning with the claw appropriately pressed onto the inner wall of the abdomen, so as to positively rake the guts out of the abdominal cavity without scraping the meat off. Therefore, when the invention is applied to the disposal of walleye pollacks, the cod roe can be collected without being damaged. Accordingly, the disposal of pollacks can be automated, without the fear of damaging the cod roe, so providing an improved working efficiency.

As has been described, according to the invention, head separating means and guts removing means are provided in sequence close to the upper and lower runs of a chain conveyor by which fish bodies are conveyed with their abdomen directed outwardly of the circular path of the chain conveyor. Therefore, the head removal and the guts removal are simply and reasonably performed.

The conveying means have been described to be constituted by a chain conveyor and sprockets. However, this is not exclusive, and the conveying means may be constituted by flat belts or V belts made of rubber or plastic.

Also, the disc-like form of the head cutter is not exclusive. Those cutters capable of cutting the head, e.g. endless belt saw, reciprocating saw or cutters having no saw teeth, can be used as the head cutter.

The head thruster can be dispensed with, if the kind of fish and the yield of the meat are not of substantial interest. Then, the head is completely separated by the cutter.

Further, any other mechanism which can afford the movement of guts removing claw as illustrated in FIG. 9 can be used as the guts removing means.

It will be seen from the foregoing description that, according to the invention, and special structural features as stated above, the separation of head and guts from fish body can be automatically performed very easily at efficiently at high speeds.

What is claimed is:

1. A fish processing system comprising an endless conveying means going round sprockets, said endless conveying means carrying a plurality of chuck units arranged at a suitable pitch; head separating means positioned in the vicinity of the upper run of said endless conveying means; and guts removing means disposed close to the lower run of said endless conveying means, said guts removing means comprising an operating rod means provided at its end with a claw, said operating rod means selectively moving said claw along the wall of the abdominal cavity of the fish body cleared of the head.

2. A fish processing system as claimed in claim 1, wherein said chuck unit comprises at least a pair of clamping arms adapted to be moved to and from fish body to cramp the latter, and a plurality of chuck claws in the form of spikes, provided on the faces of said clamping arms for engaging said fish body.

3. A fish processing system as claimed in claim 1, wherein said head separating means comprises a head cutter adapted to cut the fish at a portion between the head and the body to the depth slightly above the backbone, a depressing rod adapted to depress the head, which has been partially separated from the body by said cutter, at the jaw portion, so as to bend the head downward in cooperation with a bottom plate having an edge below the cut portion of the fish body, and thrusting rod adapted to thrust down the bent head at the backbone to completely separate the head from the body.

4. A fish processing system comprising an endless conveying means going round sprockets, said endless conveying means carrying a plurality of chuck units arranged at a suitable pitch; head separating means positioned in the vicinity of the upper run of said endless conveying means, said head separating means comprising a head cutter adapted to cut the fish at a portion between the head and the body to the depth above the backbone, a depressing rod adapted to depress the head, which has been partially separated from the body by said cutter, at the jaw portion, so as to bend the head downward in cooperation with a bottom plate having an edge below the cut portion of the fish body, and thrusting rod adapted to thrust down the bent head at the backbone to completely separate the head from the body; and guts removing means disposed close to the lower run of said endless conveying means.

5. A fish processing system comprising an endless conveying means going round sprockets, said endless conveying means carrying a plurality of chuck units arranged at a suitable pitch, said chuck units comprising at least a pair of clamping arms adapted to be moved to and from fish body to clamp the latter, and a plurality of chuck claws in the form of spikes, provided on the faces of said clamping arms for engaging said fish body; head separating means positioned in the vicinity of the upper run of said endless conveying means, said head separating means comprising a head cutter adapted to cut the fish at a portion between the head and the body to the depth slightly above the backbone, a depressing rod adapted to depress the head, which has been partially separated from the body by said cutter, at the jaw portion, so as to bend the head downward in cooperation with a bottom plate having an edge below the cut portion of the fish body, and thrusting rod adapted to thrust down the bent head at the backbone to completely separate the head from the body; and guts removing means disposed close to the lower run of said endless conveying means.

6. A fish processing system comprising an endless conveying means going round sprockets, said endless conveying means carrying a plurality of chuck units arranged at a suitable pitch; head separating means positioned in the vicinity of the upper run of said endless conveying means; and guts removing means disposed close to the lower run of said endless conveying means, said guts removing means comprising an operating rod provided at its end with a claw, said operating rod being adapted to be actuated to cause a movement of said claw along the wall of the abdominal cavity of the fish body cleared of the head, a connecting rod pivotally secured to the base portion of said operating rod, a bent portion extending from the lower end of said connecting rod substantially in parallel with said operating rod, a first resilient member adapted to resiliently bias said bent portion and said operating rod close to each other, a first adjusting bolt acting between said operating rod and said bent portion to resist said first resilient member, a driving rod pivotally secured to the lower end of said connecting rod and adapted to reciprocate in the direction substantially in parallel with the axis of said operating rod, a projecting portion extending from an upper portion of said connecting rod in the direction opposite to said bent portion, a second resilient member adapted to resiliently bias said projecting portion and said driving rod to get close to each other, and a second adjusting bolt acting between said projecting portion and said driving rod, so as to resist to the biasing force of said second resilient member.

7. A fish processing system comprising an endless conveying means going round sprockets, said endless conveying means carrying a plurality of chuck units arranged at a suitable pitch, said chuck units comprising at least a pair of clamping arms adapted to be moved to and from fish body to clamp the latter, and a plurality of chuck claws in the form of spikes, provided on the faces of said clamping arms for engaging said fish body; head separating means positioned in the vicinity of the upper run of said endless conveying means; and guts removing means disposed close to the lower run of said endless conveying means, said guts removing means comprising an operating rod provided at its end with a claw, said operating rod being adapted to be actuated to cause a movement of said claw along the wall of the abdominal cavity of the fish body cleared of the head, a connecting rod pivotally secured to the base portion of said operating rod, a bent portion extending from the lower end of said connecting rod substantially in parallel with said operating rod, a first resilient member adapted to resiliently bias said bent portion to resist said first resilient member, a driving rod pivotally secured to the lower end of said connecting rod and adapted to reciprocate in the direction substantially in parallel with the axis of said operating rod, a projecting portion extending from an upper portion of said connecting rod in the direction opposite to said bent portion, a second resilient member adapted to resiliently bias said projecting portion and said driving rod to get close to each other, and a second adjusting bolt acting between said projecting portion and said driving rod, so as to resist to the biasing force of said second resilient member.

* * * * *